United States Patent [19]

Legare

[11] Patent Number: 5,696,189
[45] Date of Patent: Dec. 9, 1997

[54] PERFLUOROELASTOMER COMPOSITIONS

[75] Inventor: John Michael Legare, Newark, Del.

[73] Assignee: E. I. Du Pont de Nemours and Company, Wilmington, Del.

[21] Appl. No.: 566,235

[22] Filed: Dec. 1, 1995

[51] Int. Cl.⁶ .................................................. C08K 5/20
[52] U.S. Cl. ..................... 524/232; 524/251; 524/423; 524/430; 524/432; 524/437
[58] Field of Search ........................ 524/423, 232, 524/251, 430, 432, 437

[56] References Cited

U.S. PATENT DOCUMENTS

| | | | |
|---|---|---|---|
| 3,311,585 | 3/1967 | Edlin | 260/29.7 |
| 4,271,275 | 6/1981 | MacLachlan | 525/112 |
| 4,281,092 | 7/1981 | Breazeale | 526/247 |
| 4,599,370 | 7/1986 | Grossman et al. | 523/200 |
| 4,708,988 | 11/1987 | Tabb | 525/194 |
| 4,713,418 | 12/1987 | Logothetis et al. | 525/200 |
| 4,722,758 | 2/1988 | Barrett et al. | 156/53 |
| 4,879,362 | 11/1989 | Morgan | 526/247 |
| 4,900,793 | 2/1990 | Lagow et al. | 525/326.3 |
| 4,904,726 | 2/1990 | Morgan et al. | 524/520 |
| 4,983,680 | 1/1991 | Ojakaar | 525/281 |
| 5,206,293 | 4/1993 | Sakai et al. | 525/194 |
| 5,317,074 | 5/1994 | Hammar et al. | 528/44 |
| 5,444,116 | 8/1995 | Amin et al. | 524/495 |
| 5,461,107 | 10/1995 | Amin et al. | 524/495 |

FOREIGN PATENT DOCUMENTS

| | | |
|---|---|---|
| 0 038 535 | 10/1981 | European Pat. Off. . |
| 62-81440 | 4/1987 | Japan . |
| WO 95/02634 | 1/1995 | WIPO . |

OTHER PUBLICATIONS

Research Disclosure 28547 Jan. 1988, Improved Acid Resistance of Fluoroelastomers with PTFE Resin.

Anestis Logothetis, Chemistry of Fluorocarbon Elastomers, Prog. Polym Sci. 14, 251 (1989).

Primary Examiner—Peter D. Mulcahy

[57] ABSTRACT

Perfluoroelastomer compositions substantially free of elemental carbon, having selected metallic reinforcing filler and titanium dioxide, when cured, exhibit excellent performance characteristics in dry process semiconductor sealing applications.

25 Claims, No Drawings

PERFLUOROELASTOMER COMPOSITIONS

BACKGROUND OF THE INVENTION

Perfluoroelastomers have achieved outstanding commercial success, and are used in a wide variety of applications in which severe environments are encountered, including high temperatures and aggressive chemicals.

The manufacture of electronic components, such as semiconductor devices, presents unusually stringent requirements for sealing components used in such processing. A remaining unmet need exists for elastomeric compositions that will function satisfactorily in the unusual process conditions found in dry semiconductor manufacturing environments, in which the seal is often exposed to reactive plasmas, corrosive cleaning gases and high temperatures.

SUMMARY OF THE INVENTION

The instant invention provides perfluoroelastomer compositions which can be effectively used in the processing conditions found with dry process semiconductor manufacturing environments.

Specifically, the instant invention provides a perfluoroelastomer composition substantially free of elemental carbon comprising:

(A) at least one curable elastomeric perfluoropolymer;

(B) about 0.1–5.0 parts, per 100 parts by weight of the perfluoropolymer, of curative;

(C) about 1.0–25 parts, per 100 parts by weight of the perfluoropolymer, of at least one metallic reinforcing filler selected from the group consisting of silicon dioxide, barium sulfate, aluminum oxide and aluminum silicate; and (D) about 1.0–25 parts, per 100 parts by weight of the perfluoropolymer, of titanium dioxide.

Preferably, the perfluoroelastomer composition further comprises about 0.1–5.0 parts, per 100 parts by weight of the perfluoropolymer, of at least one acid acceptor selected from organic amines having a pKa of at least about 10 and metal oxides selected from the group consisting of zinc oxide and tin oxide. The composition also preferably further comprises about 1.0–25 parts, per 100 parts by weight of the perfluoropolymer, of at least one fluoropolymer filler.

DETAILED DESCRIPTION OF THE INVENTION

The compositions of the present invention are based on elastomeric perfluoropolymers, that is, substantially fully fluorinated fluoropolymers which, when cured, exhibit an elastomeric character. The fluoropolymers contain moieties to render the polymer crosslinkable by use of one or more appropriate curatives.

Curable elastomeric perfluoropolymers which are the basic component of the present compositions are typically based on and prepared primarily from two or more perfluorinated monomers such as tetrafluoroethylene (TFE) and perfluoro (alkyl vinyl) ether (PAVE) having the formula $CF_2=CFO(CF_2CFXO)_nR_f$ wherein X is F or $CF_3$, n is 0–5, and $R_f$ is a perfluoroalkyl group of 1–6 carbon atoms. A preferred PAVE for use in the present invention is perfluoro (methyl vinyl) ether (PMVE). Minor portions of the TFE can be replaced by other perhaloolefins, such as chlorotrifluoro ethylene (CTFE). Preferred PAVEs for use in this invention include (PMVE), perfluoro(propyl vinyl) ether (PPVE), and certain PAVEs for which n is not zero in the formula above. These monomers are typically used in conjunction with a comonomer which facilitates crosslinking. Small concentrations of monomers which are not perfluorinated can also be used. Normally, such monomers are employed to obtain desirable crosslinking characteristics and may be present in concentrations of up to about 3 mole %. Examples of such monomers include bromotetrafluorobutene, bromotrifluoroethylene, vinylidene fluoride and monomers containing nitrile groups.

Alternatively or additionally, chain transfer agents that are not perfluorinated can be used in the polymerization reaction to introduce desirable fragments into the polymer for curing purposes, and are considered cure site moieties in the context of the present invention. Such agents include di-iodo compounds that result in bound iodine in the polymer, commonly at the end of the molecule. Curable elastomeric perfluoropolymer which can be used in the present invention include those described in U.S. Pat. Nos. 3,467,638 (Pattison); 4,035,565 (Apotheker et al); 4,214,060 (Apotheker et al); 4,243,770 (Tatemoto et al); 4,281,092 (Breazeale); 4,394,489 (Aufdermarsh); 4,525,539 (Feiring); 4,529,784 (Finlay); 4,948,853 (Logothetis); 4,972,028 (Logothetis; 4,983,680 (Ojakaar); 5,173,553 (Albano et al); 5,447,993 (Logothetis); 4,983,680 (Ojakaar).

The perfluoroelastomer compositions of the present invention further comprise about 0.1–5.0 phr of at least one curative. For peroxide curable perfluropolymers, the curative should comprise organic peroxide and a co-agent for the peroxide. A wide variety of organic peroxides can be used, provided the organic peroxide is of the alkyl type. One organic peroxide that has been found to be particularly satisfactory is 2, 5-dimethyl-2,5-di (t-butylperoxy)hexane, commercially available from Atochem, Inc. as Lupersol 101. The organic peroxide has been found to be particularly satisfactory in concentrations of about 1-3 phr. While some forms of the organic peroxide are available on an inert carrier, such as Luperco 101-XL (45% active ingredient), the concentrations indicated are based on 100% active organic peroxide.

For peroxide-curable perfluoropolymers, the curative in the perfluoroelastomer compositions of the present invention further comprises organic coagent to aid in the crosslinking reaction. In general, the coagent is present in an mount between about 0.1 and about 10 phr, and preferably between 2 and 5 phr. A wide variety of organic coagents can be used, including triallyl isocyanurate, trimethylallyl isocyanurate and trimethylolpropane trimethacrylate, of which triallyl isocyanurate has been found to be particularly satisfactory. Triallyl isocyanurate and trimethylallyl isocyanurate are available from the DuPont Company as Diak #7 and Diak #8. Trimethylolpropane trimethacrylate is commercially available from the Sartomer Company as Saret 350.

When the perfluoropolymer is curable by an organotin metallic curative such as tetraphenyltin, this material should be present in the same general amounts. For those perfluoroelastomers containing a plurality of nitrile cure sites, it is often desireable to use both organic peroxide and organotin curatives. This combination of curatives also provides surprisingly improved themal stability and long term compression set resistance when compared to peroxide alone. In this case, the curative can comprise a mixture of tin catalyst, a peroxide capable of crosslinking the perfluoroelastomer, and a coagent which is a diene or triene.

The compositions of the present invention comprise about 1.0–25 parts, by weight of the perfluoropolymer, of at least one metallic reinforcing filler selected from the group consisting of silicon dioxide, barium sulfate, aluminum oxide and aluminum silicate. The reinforcing fillers of this invention provide the desired mechnical reinforcement while being chemically compatible with the process and equipment used in fabricating silicon wafers for the semiconductor industry. Of these, one or both of the barium sulfate and silicon dioxide have been found to be particularly beneficial in providing outstanding long term compression set and thermal stability.

The compositions of the present invention comprise about 1.0–25 pars, by weight of the perfluoropolymer, of titanium dioxide. This pigment provides a desireable whiteness to the cured articles resulting from the present compositions, consistent with the absence of elemental carbon.

The perfluoroelastomer compositions of the present invention preferably further include about 0.1–5.0 phr of an acid acceptor. The acid acceptor can be selected from strongly basic organic amines and metal oxides selected from the group consisting of zinc oxide and tin oxide. These metal oxides have been found to be more desireable than other known acid acceptions such as, magnesium oxide and calcium oxide which can potentially interfere with the curing mechanism of the perfluoroelastomer. When an organic amine is used, it should have a pKa of at least about 10, and preferably at least about 12. One such organic anime that has been found to be particularly satisfactory is 1,8-bis-(dimethylamino) napthalene, commercially available from Aldrich Chemical Company as Proton Sponge. Another particularly satisfactory acid acceptor is octadecylamine, commercially available from Akzo Chemicals, Inc. as Armeen 18-D. When a metal oxide is used, zinc oxide has been found to be particularly satisfactory, and is accordingly preferred.

The use of an acid acceptor has been found to improve the physical characteristics of the cured perfluoroelastomer. The acid acceptor also has been found to substantially reduce the amount of fluoride evolved from the cured perfluoroelastomer especially at elevated temperatures. In general, about from 0.1 to 5.0 phr of acid acceptor are used, and about from 0.1 to 1.0 phr have been found to be particularly satisfactory.

The compositions of the present invention preferably further comprise about from 1 to 25 phr of a fluoropolymer filler, and especially at least about 2 phr of the filler. The fluoropolymer filler, if present, improves the mechanical properties of the cured perfluoroelastomer as well as the processability of curable composition.

The fluoropolymer filler used in the present compositions can be any finely divided, easily dispersed plastic fluoropolymer that is solid at the highest temperature utilized in fabrication and curing of the fluoroelastomer composition. By solid is meant that the fluoroplastic, if partially crystalline, has a crystalline melting temperature above the elastomeric fluoropolymer processing temperature, and, if amorphous, has a glass transition temperature above the elastomeric fluoropolymer processing temperature. Such finely divided, easily dispersed fluoropolymers are commonly called micropowders or fluoroadditives. Micropowders are ordinarily partially crystalline polymers.

Micropowders that can be used in the compositions of this invention can include those based on the group of polymers known as tetrafluoroethylene (TFE) polymers. This group includes homopolymers of TFE (PTFE) and copolymers of TFE with such small concentrations of copolymerizable modifying monomers that the resins remain non-melt-fabricable (modified PTFE). The modifying monomer can be, for example, hexafluoropropylene (HFP), perfluoro (propyl vinyl) ether (PPVE), perfluorobutyl ethylene, chlorotrifluoroethylene, or other monomers that introduces side groups into the molecule. The concentration of such modifiers is usually less than 1 mole %.

The PTFE resins used in the compositions of this invention include both those derived from suspension polymerization and from emulsion polymerization. The group of TFE polymers also includes melt-fabricable copolymers of TFE with sufficient concentrations of one or more copolymerizable monomer to reduce the melting point significantly below that of PTFE. Such copolymers generally have a melt viscosity of about 0.5–60×10$^3$ Pa-s, but copolymers having viscosities outside of this range can also be used. Comonomers with TFE can include perfluoroolefins and perfluoro (alkyl vinyl) ethers, for example, and these are preferred. Among perfluorinated comonomers, HFP and PPVE are most preferred.

High molecular weight PTFE used for micropowder is usually subjected to ionizing radiation to reduce its molecular weight. This facilitates grinding and enhances friability if the PTFE is produced by the suspension polymerization process, or suppresses fibrillation and enhances deagglomeration if the PTFE is produced by the emulsion polymerization process. It is also possible to polymerize TFE directly to PTFE micropowder by appropriate control of molecule weight in the emulsion polymerization process. Mogan, in U.S. Pat. No. 4,879,362, discloses a non-melt-fabricable, non-fibrillating TFE copolymer produced by the emulsion (dispersion) polymerization process that can be used in selected fluoroelastomer compositions. This polymer forms platelets on shear blending into elastomeric compositions, instead of fibrillating. Morgan & Stewart, in U.S. Pat. No. 4,904,726, disclose the utility of Morgan's polymer in blends with elastomers, demonstrating benefit to mechanical properties, notably tear strength. If the viscosity of the host fluoroelastomer of the composition of this invention is high, Morgan's polymer may increase viscosity to unacceptable levels and a different micropowder should be selected.

Melt fabricable TFE copolymers such as FEP (TFE/HFP copolymer) and PFA (TFE/PPVE copolymer) can also be used in the fluoroelastomer compositions of this invention, provided they satisfy the constraint on melting temperature with respect to fluoroelastomer processing temperature. These copolymers can be used in powder form as isolated from the polymerization medium, if particle size is acceptable, or can be ground to suitable particle size starting with stock of larger dimensions.

In general, at least about 2 phr, based on the elastomeric perfluoropolymer, of the fluoropolymer filler is used. The fluoropolymer filler preferrably consists essentially of at least one tetrafluoryethylene (TFE) polymer, and copolymers of TFE and PPVE have been found to be particularly satisfactory. Those fluropolymer fillers commercially available from the DuPont Company as Teflon® MP-1600 fluoroadditives are particularly preferred for use in the present invention.

The compositions of the present invention can further include additives to enhance processability, as will be evident to those skilled in the art. The compositions of the present invention can further comprise at least about 1 phr of plasticizer, and generally less than about 20 phr. In general, less than about 10 phr are preferred. Plasticizers which have been found particularly satisfactory include perfluoropolyethers.

The compositions of the present invention are substantially free from elemental carbon, such as carbon black, graphite or fluorinated graphite. Elemental carbon in the form of carbon black has been found to oxidize in reactive plasma environments, particularly those containing oxygen, used during the fabrication of silicon wafers for the semiconductor industry. As a result of seal degradation, the oxidized carbon black can leach out, contaminating the reactive plasma process stream and adversely affecting wafer production part yields.

The use of silicon dioxide, barium sulfate, aluminum oxide and aluminum silicate as metallic reinforcing fillers in compositions of the present invention is based on their apparent relative stability in oxygen plasma environments vice elemental carbon. In addition, the reinforcing fillers of the present invention provide the desired mechanical reinforcement, tensile properties and hardness, while being chemically compatible with the processes and equipment used during the fabrication of silicon wafers for the semiconductor industry.

The compounds of the present invention exhibit outstanding performance characteristics in dry semiconductor processing environments compared with similar perfluoroelastomer compositions. Compared to those compositions containing carbon black as a filler, the present formulations, substantially free of elemental carbon, exhibit significantly lower weight loss on exposure to reactive plasmas, and particularly those containing oxygen. Specifically, the present compositions, containing metallic reinforcing filler, exhibit significantly lower weight loss on exposure to reactive plasmas when compared to formulations containing titanium dioxide and fluoropolymer filler without the metallic reinforcing filler required in the present invention.

With the unique combination of performance characteristics exhibited by the compositions of the present invention, they can be used effectively as plunger seals, door seals, lip and face seals, gas delivery plate seals, wafer support seals, barrel seals and o-ring seals in semiconductor wafer fabrication and processing equipment.

Perfluoroelastomer compositions of the present invention are particularly suited for seals used in dry process semiconductor manufacturing environments, in which the seal is often exposed to reactive plasmas, corrosive cleaning gases and high temperatures. The present compositions exhibit outstanding performance in 100 % oxygen and Mixed Plasma sealing applications. By Mixed Plasma is meant mixtures of ionized gases such as the combination of oxygen gas and hexafluoroethylene; $SF_6$ and oxygen; or $SF_6$ and chlorine. The present compositions exhibit lower weight loss and reduced particle generation properties, thereby extending seal life in these environments. The present compositions exhibit outstanding performance in high temperature furnace and in quartz sealing applications. This results from low evolved fluoride emissions, even at markedly elevated temperatures. This minimizes corrosion and surface etching effects on stainless steel and quartz window sealing components. In addition, the present compositions exhibit outstanding long term thermal stability and compression set resistance and high vacuum sealing performance. While the specific parameters that contribute to these performance characteristics are not fully understood, they are believed to be due in part to the combination of components used in the present formulations.

The present invention is further illustrated by the following examples, in which parts are by weight unless otherwise indicated.

EXPERIMENTAL PROCEDURES

In the following examples, compounds of perfluoroelastomer with other specified ingredients were prepared on a two-roll rubber mill with the rolls heated to a temperature not greater than about 60° C., depending on the specific polymer being processed. In the mill mixing process, the perfluoroelastomer polymer is first introduced to the roll nip alone, milled until a band is formed and the polymer is well blended, and milled until a rolling bank is maintained on the mill. Additives which were previously weighed out, were then added to the nip and the resulting composition milled until uniform.

The compounded blends were converted to a form suitable for physical property testing by compression molding into either dumbells or o-rings. Curing and postcuring followed procedures outlined in the various examples. Specimens for physical property testing were prepared as called for by the test methods summarized in Table I.

TABLE I

| PHYSICAL TEST METHODS | | |
|---|---|---|
| Symbol | Physical Property | Test Method |
| $M_{100}$ | Modulus at 100% Elongation | ASTM D-412 & ASTM D-1414 |
| $T_b$ | Tensile strength at break | ASTM D-412 & ASTM D-1414 |
| $E_b$ | Elongation at break | ASTM D-412 & ASTM D-1414 |
| H | Durometer A Hardness | ASTM D-2240 |
| CS | Compression Set | ASTM D-395 & ASTM D-1414 |
| HA | Heat Aging | ASTM D-573 & ASTM D-1414 |

EVOLVED FLUORIDE TEST PROCEDURE

Evolved fluoride was measured in parts per million of evolved fluorine after thirty minutes using a fluoride ion selective electrode at 300 degrees C. In this procedure, a sample was placed in a gold furnace and heated for 30 minutes at a constant temperature. The off-gases were collected in two impingers containing a weakly basic solution of water and absorbent. Water/absorbent solution analyzed for evolved Fluoride (F–) Ion using a Dionex Ion Chromatograph. Test results expressed in parts per million of evolved Fluoride Ion at a specific test temperature.

GOLD FURNACE CONDITIONS

Sample Weight—0.5 to 1.0 grams
Test Temperature—various
Heating Time—30 minutes
Purge Gas—Nitrogen
Gas Flow Rate—100 ml/min
Gas Collection—20 milliliters of absorbent per impinger
Absorbent Types—30 mM $NaHCO_3$//24 mM $Na_2CO_3$

ION CHROMATOGRAPHY CONDITIONS

Instrument—Dionex Ion Chromatograph
Column Type—Dionex AS3
Flow Rate—3 milliliters per minute
Sample Loop—250 microliters
Eluent Types—30 mM $NaHCO_3$//24 mM $NaHCO_3$
Temperature Compensation—1.7 % per degree C

PLASMA WEIGHT LOSS TEST PROCEDURE

Wear protective gloves during handling of o-ring test specimens and test fixture assembly. Wipe/clean surface of o-ring test specimens and test fixture assembly using either Acetone or Isopropyl Alcohol prior to testing. Weigh each o-ring test specimen on an analytical balance to the nearest 0.0001 gram. Measure the cross-sectional diameter (CSD) of each o-ring test specimen using a pair of calipers. Calculate thickness of spacer required to insure an o-ring compression of 25% using the formula CSD×0.75=required spacer thickness.

Place o-ring test specimen and required spacer into test fixture. Tighten test fixture assembly. Expose o-ring test specimens to reactive plasma. After exposure, remove o-ring test specimens from assembly. Allow o-ring test specimens to cool to ambient temperature. Weigh each o-ring test specimen on an analytical balance to the nearest 0.0001 gram. Calculate % weight loss as a result of plasma exposure using the formula (weight after exposure−weight before exposure)/(weight before exposure)×100=% weight loss.

PLASMA TEST CONDITIONS

Plasma Etcher Used—Branson IPC, Model #S3003-181-3ST

Plasma Types Used—100% Oxygen and 50/50 Mixed Plasma (O2/C2F6)

Plasma Exposure Conditions—100% Oxygen—120 minutes at 500 watts at 0.5 torr −50/50 Mixed Plasma—120 minutes at 500 watts 1.25 torr Gas Flow Rate—200 sccm Distance Away from Plasma Source—20 mm Number of O-Ring Specimens Tested per Compound—2 per Plasma Type

EXAMPLES 1–3

In Examples 1–3, a curable elastomeric perfluoropolymer was prepared from TFE, PMVE and 8-CNVE in which 8-CNVE is the curesite monomer perfluoro-(8-cyano-5-methyl-3, 6-dioxa-1-octene). The polymerization was carried out in a 5 L mechanically stirred, water-jacketed. Stainless steel autoclave operated continuously at 85 C and 6.2 Mpa (900 psi) pressure. An aqueous solution consisting of 20 l of deionized water, 93 g of ammonium persulfate, 553 g of disodium hydrogen phosphate heptahydrate and 182 g of ammonium perfluooctanoate ("Fluorad FC-143, 3M CO.) was pumped into the autoclave at a rate of 688 ml/h. At the same time another aqueous solution consisting of 20 l of deionized water and 177 g of ammonium perfluooctanoate was also pumped in at a rate of 688 ml/h. A third pump pumped at the same time 30.3 g/h of perfluoro-(8-cyano-5-methyl-3, 6-dioxa-1-octene). By means of a diaphragm compressor a gaseous mixture of tetrafluoroethylene (376 g/h) and perfluoro(methylvinyl ether) (390 g/h) was fed simultaneously as the other streams at a constant rate. The polymer latex was removed continuously by means of a let down valve and unreacted monomers were vented. The latex from 32 h operation was collected. The polymer isolation was carried out as follows: 5 l of the above latex was added with stirring to a preheated (90–95 C) solution consisting of 225 g of magnesium sulfate heptahydrate and 40 l of deionized water. The coagulated crumb polymer was filtered, washed repeatedly with water and dried in an air oven at 70 c for 48 h. The dried polymer weighed 2280 g and had the following composition, 42.5 wt % perfluoro (methylvinyl ether), 3.3 wt % perfluoro-(8-cyano-5-methyl-3, 6-dioxa-1-octene) the rest being tetrafluoroethylene. The polymer had inherent viscosity of 0.48 dl/g measured in a solution containing 0.1 g of polymer per 100 g of solvent consisting of 60/40/3 volume ratio of heptafluoro-2,2,3-trichlorobutane, perfluoroCoutyltetrahydrofuran) and ethylene glycol dimethyl ether. The mooney viscosity (ML-10) was measured at 150 C and gave a value of 30. The elastomeric perfluoropolymer was compounded with 1 phr of tetraphenyltin curative, either silicon dioxide or barium sulfate reinforcing filler, titanium dioxide and zinc oxide acid acceptor and fluoropolymer filler in the amounts indicated Table II, presscured, postcured and tested according to standard test procedures. Test slabs, pellets, and o-ring test specimens were presscured for 20 minutes at 210° C., then postcured in a nitrogen atmosphere in a circulating oven at 90° C. for 6 hours, followed by a uniform transition to 305° C over 10 hours and in turn followed by 26 hours at 305° C. The specimens were tested for physical properties and the test results are reported in Table II.

EXAMPLES 4–7

In Examples 4–7, the procedure of Examples 1–3 was repeated, using a curative comprising a mixture of 2 phr of the tetraphenyltin curative, 1 phr "Luperco 101XL" peroxide curative, and 1 phr of TAIC (DIAK #7) curing coagent. The specimen were tested as before and the test results similarly reported in Table II.

COMPARATIVE EXAMPLES A and B

In examples A and B an elastomeric perfluoropolymer was prepared from TFE, PMVE, and 8-CNVE (in an approximate monomer weight ratio of 56/42/2) in which 8-CNVE is the cure site monomer perfluoro-(8-cyano-5-methyl-3,6,-dioxa-1-octene). It was prepared generally as described in U.S. Pat. No. 4,281,092. In Example A, the elastomeric perfluoropolymer was compounded with 3 phr of tetraphenyltin curative, 12 phr carbon black, and 0.3 18 crown 6 crown ether as shown in Table II. In Example B the elastomeric perfluoropolymer was compounded with 2 phr of tetraphenyl tin curative, 10 phr of Teflon micropowder, 3 phr titanium dioxide, and 0.2 phr 18 crown 6 crown ether. The elastomeric compounds were presscured, postcured, and tested according to standard test procedures. Test slabs, pellets, and o-ring test specimens were press cured for 20 minutes at 210° C., then postcured in a nitrogen atmosphere in a circulating oven at 90° C. for 6 hours, followed by a uniform transition to 305° C. over 10 hours and in turn followed by 26 hours at 305° to 305° C. over 10 hours and in turn followed by 26 hours at 305° C. The specimens were tested for physical properties and the test results are also reported in Table II.

TABLE II

| | EXAMPLE | | | | | | | | |
|---|---|---|---|---|---|---|---|---|---|
| | A | B | 1 | 2 | 3 | 4 | 5 | 6 | 7 |
| FORMULATION (phr) | | | | | | | | | |
| PERFLUOROPOLYMER | 100.0 | 100.0 | 100.0 | 100.0 | 100.0 | 100.0 | 100.0 | 100.0 | 100.0 |
| SILICON DIOXIDE | — | — | 10.0 | — | — | — | 17.5 | 17.5 | — |
| BARIUM SULFATE | — | — | — | 12.5 | 17.5 | 12.5 | — | — | — |
| FLUOROPOLYMER FILLER | — | 10.0 | 10.0 | 12.5 | 5.0 | 12.5 | 5.0 | 5.0 | 12.5 |
| TITANIUM DIOXIDE | — | 3.0 | 10.0 | 12.5 | 17.5 | 12.5 | 17.5 | 17.5 | 12.5 |
| ZINC OXIDE | — | — | 1.0 | 1.0 | 1.0 | 1.0 | 1.0 | — | 1.0 |
| ALUMINUM SILICATE | — | — | — | — | — | — | — | — | 12.5 |
| PHYSICAL PROPERTIES ASTM TEST SLABS/PELLETS | | | | | | | | | |
| $M_{100}$, psi | 960 | 330 | 518 | 545 | 680 | 785 | 1145 | 931 | 1020 |
| $T_b$, psi | 2080 | 1500 | 1480 | 1380 | 1700 | 2185 | 2227 | 2074 | 1790 |
| $E_b$, psi | 145 | 245 | 212 | 211 | 215 | 205 | 186 | 227 | 201 |
| Shore A hardness, pts | 77 | 65 | 76 | 76 | 75 | 79 | 82 | 80 | 78 |
| Comp. Set, 70 HRS. AT 200° C., % AS568A-214 | 24.5 | 17.5 | 26.0 | 20.0 | 31.9 | 34.0 | 30.5 | 31.8 | 41.4 |
| O-RINGS | | | | | | | | | |
| $M_{100}$, psi | 854 | 318 | 613 | 609 | 584 | 914 | 1081 | 909 | — |
| $T_b$, psi | 1571 | 1074 | 1430 | 1382 | 1484 | 1769 | 1853 | 1826 | — |
| $E_b$, psi | 145 | 261 | 205 | 213 | 258 | 178 | 196 | 210 | — |
| Shore A hardness, pts | 80 | 71 | 80 | 81 | 80 | 82 | 83 | 83 | — |
| Comp. Set, 70 HRS. AT 200° C., % | 37.1 | 44.1 | 27.2 | 26.5 | 31.9 | 38.5 | 39.5 | 29.6 | — |
| PPM EVOLVED F- AFTER 30' USING FLUORIDE ION SELECTIVE ELECTRODE AT 300° C. | 2300 | 1400 | 680 | 340 | 390 | 650 | 670 | 860 | — |
| PLASMA RESISTANCE % WEIGHT LOSS 100% OXYGEN PLASMA | 0.210 | 0.125 | 0.116 | 0.090 | 0.096 | 0.103 | 0.103 | 0.097 | — |
| 50/50 OXYGEN/ C2F6 MIXED PLASMA | 0.453 | 0.381 | 0.172 | 0.148 | 0.228 | 0.240 | 0.155 | 0.273 | — |
| LONG TERM COMPRESSION SET RESISTANCE-25% COMPRESSION AS568A-214 O-RINGS - % SET | | | | | | | | | |
| 672 HRS. AT 200° C. | 51.6 | 46.4 | 37.1 | 35.9 | 45.1 | 47.8 | 62.5 | 48.6 | — |
| 672 HRS. AT 250° C. | 62.8 | 44.3 | 55.7 | 43.9 | 63.4 | 61.1 | 71.9 | 59.2 | — |
| LONG TERM THERMAL STABILITY AS568A-214 O-RINGS HEAT AGING - 672 HRS. AT 200° C. | | | | | | | | | |
| 100% MOD, % CHG. | +6.9 (913) | +3.5 (329) | +38.8 (851) | +48.9 (907) | +84.4 (1079) | +40.7 (1288) | +42.6 (1542) | +39.5 (1266) | — |

TABLE II-continued

| | EXAMPLE | | | | | | | | |
|---|---|---|---|---|---|---|---|---|---|
| | A | B | 1 | 2 | 3 | 4 | 5 | 6 | 7 |
| $T_b$, % CHG. | +58.2 (2486) | +34.2 (1441) | +29.7 (1854) | +57.4 (2175) | +49.2 (2184) | +30.4 (2307) | +32.1 (2446) | +19.1 (2175) | — |
| $E_b$, % CHG. | +19.3 (173) | −5.7 (246) | −11.2 (182) | −7.0 (198) | −25.6 (192) | −10.1 (160) | −15.8 (165) | −11.9 (185) | — |
| DURO, PTS. CHG. | +1 | 0 | +2 | +4 | +3 | +2 | +2 | +2 | — |
| % WEIGHT CHANGE | −0.8 | −0.8 | −0.4 | −0.3 | −0.3 | −0.4 | −0.4 | −0.4 | — |
| HEAT AGING - 672 HRS. AT 250° C. | | | | | | | | | |
| 100% MOD, % CHG. | −42.0 (495) | −19.8 (256) | −10.9 (546) | +15.3 (702) | +33.4 (779) | −40.5 (544) | −37.9 (671) | −26.1 (672) | — |
| $T_b$, % CHG. | +13.5 (1783) | −5.4 (1018) | −16.6 (1192) | +10.6 (1526) | +26.6 (1854) | −28.5 (1300) | −32.7 (1246) | −28.6 (1304) | — |
| $E_b$, % CHG. | +100.0 (290) | +16.5 (304) | +18.0 (241) | −9.4 (198) | −15.9 (217) | +51.1 (269) | +49.5 (293) | +30.9 (275) | — |
| DURO, PTS. CHG. | −1 | −2 | 0 | +2 | +2 | +1 | 0 | 0 | — |
| % WEIGHT CHANGE | −3.8 | −2.7 | −1.9 | −1.8 | −1.8 | −2.3 | −2.2 | −2.1 | — |

I claim:

1. A perfluoroelastomer composition substantially free of elemental carbon comprising:

(A) at least one curable elastomeric perfluoropolymer;

(B) about 0.1–5.0 parts, per 100 parts by weight of the perfluoropolymer, of curative;

(C) about 1.0–25 parts, per 100 parts by weight of the perfluoropolymer, of at least one metallic reinforcing filler selected from the group consisting of silicon dioxide, barium sulfate, aluminum oxide and aluminum silicate;

(D) about 1.0–5.0 parts, per 100 parts by weight of the perfluoropolymer, of titanium dioxide; and (E) about 0.1–5.0 parts, per 100 parts by weight of the perfluoropolymer, of at least one acid acceptor selected from organic mines having a pKa of at least about 10 and metal oxides selected from the group consisting of zinc oxide and tin oxide.

2. A perfluoroelastomer of claim 1 wherein the acid acceptor consists essentially of zinc oxide.

3. A perfluoroelastomer composition of claim 1 wherein at least part of the perfluoropolymer is curable by tetraphenyltin and the curative comprises tetraphenyltin.

4. A perfluoroelastomer composition of claim 1 wherein at least part of the perfluoropolymer is peroxide curable and the curative comprises organic peroxide and a co-agent for the peroxide.

5. A perfluoroelastomer composition of claim 3 wherein at least part of the perfluoropolymer is peroxide curable and the curative comprises organic peroxide and a co-agent for the peroxide.

6. A perfluoroelastomer composition of claim 1 further comprising about 1.0–25 parts, per 100 parts by weight of the perfluoropolymer, of at least one fluoropolymer filler.

7. A perfluoroelastomer composition of claim 6 wherein the fluoropolymer filler consists essentially of at least one tetrafluoroethylene polymer.

8. A perfluoroelastomer composition of claim 7 wherein the fluoropolymer filler consists essentially of a copolymer of TFE and PPVE.

9. A perfluoroelastomer composition of claim 7 wherein the fluoropolymer filler consists essentially of a copolymer of TFE and HFP.

10. A perfluoroelastomer composition of claim 1 wherein the acid acceptor consists essentially of organic amine.

11. A perfluoroelastomer composition of claim 10 wherein the organic amine is 1, 8-bis-(dimethylamino) napthalene.

12. A perfluoroelastomer composition of claim 4 wherein the organic peroxide consists essentially of 2, 5-dimethyl-2, 5-di(t-butyl peroxy) hexane.

13. A perfluoroelastomer composition of claim 4 wherein the coagent for the peroxide is selected from TAIC and TMAIC.

14. A perfluoroelastomer composition of claim 5 wherein the organic peroxide consists essentially of 2, 5-dimethyl-2, 5-di(t-butyl peroxy) hexane.

15. A perfluoroelastomer composition of claim 5 wherein the coagent for the peroxide is selected from TAIC and TMAIC.

16. A perfluoroelastomer composition of claim 1 wherein the reinforcing filler comprises at least one of silicon dioxide and barium sulfate.

17. A perfluoroelastomer composition of claim 16 wherein the reinforcing filler consists essentially of silicon dioxide.

18. A perfluoroelastomer composition of claim 16 wherein the reinforcing filler consists essentially of barium sulfate.

19. A perfluoroelastomer composition of claim 1 wherein the reinforcing filler consists essentially of aluminum silicate.

20. A perfluoroelastomer composition of claim 1 wherein the reinforcing filler consists essentially of aluminum oxide.

21. A perfluoroelastomer composition of claim 1 further comprising at least about 1 part, per hundred parts by weight of the perfluoropolymer, of plasticizer.

22. A perfluoroelastomer composition of claim 21 wherein the plasticizer consists essentially of perfluoropolyether.

23. A perfluoroelastomer composition of claim 1 wherein the perfluoropolymer consists essentially of copolymerized units of tetrafluoroethylene, perfluoro (alkyl vinyl) ether and cure site monomer.

24. A perfluoroelastomer composition of claim 23 wherein the perfluoro (alkyl vinyl) ether consists essentially of perfluoro (methyl vinyl) ether and the cure site monomer contains nitrile groups.

25. A cured article prepared from a composition of claim 1.

* * * * *

UNITED STATES PATENT AND TRADEMARK OFFICE
CERTIFICATE OF CORRECTION

PATENT NO. : 5,696,189
DATED : December 9, 1997
INVENTOR(S) : John Michael Legare It is certified that error appears in the above-identified patent and that said Letters Patent is hereby corrected as shown below:

Title page,
OTHER PUBLICATIONS, change "28547" to -- 285047 --,

Column 2,
Line 26, change "perfluropolymers" to -- perfluoropolymers --.
Line 43, change "mount" to -- amount --.
Line 56, change "desireable" to -- desirable --.
Line 57, change "themal" to -- thermal --.

Column 3,
Line 2, change "mechnical" to -- mechanical --.
Line 10, change "pars" to -- parts --.
Line 11, change "desireable" to -- desirable --.
Line 19, change "desireable" to -- desirable --.
Line 20, change "acceptions" to -- acceptors --.
Line 24, change "anime" to -- amine --.
Line 26, change "napthalene" to -- naphthalene --.
Line 45, change "composition" to -- compositions --.

Column 4,
Line 1, change "introduces" to -- introduce --.
Line 25, change "molecule" to -- molecular --.
Line 26, change "Mogan" to -- Morgan --.
Line 50, change "preferrably" to -- preferably --.
Line 51, change "tetrafluoryethylene" to -- tetrafluoroethylene --.
Line 53, change "fluropolymer" to -- fluoropolymer --.

Column 6,
Line 12, change "dumbells" to -- dumbbells --.
Line 42, after "results" add -- are --.
Line 52, change "mi/min" to -- ml/min --.

Column 7,
Line 40, change "Stainless" to -- stainless --.
Line 40, change "85 C" to -- 85°C --.
Line 41, change "Mpa" to -- MPa --.
Line 44, change "Fluorad to -- "Fluorad" --.
Line 58, change "95 C" to -- 95°C --.

UNITED STATES PATENT AND TRADEMARK OFFICE
CERTIFICATE OF CORRECTION

PATENT NO. : 5,696,189
DATED : December 9, 1997
INVENTOR(S) : John Michael Legare It is certified that error appears in the above-identified patent and that said Letters Patent is hereby corrected as shown below:

Column 8,
Line 4, change "70 c" to -- 70°C --.
Line 12, change "perfluoroCoutyltetrahydrofuran)" to
-- perfluoro (butyltetrahydrofuran) --.
Line 13, change "mooney" to -- Mooney --.
Line 14, change "150 C" to -- 150°C --.
Line 18, after "indicated" add -- in --.
Line 33, change "specimen" to -- specimens --.
Line 44, change "18" to -- 18- --.
Line 45, change "crown 6" to -- crown-6 --.
Line 48, change "18 crown 6" to -- 18-crown-6 --.

Column 11,
Line 34, change "1.0-5.0" to -- 1.0-25.0 --.
Line 38, change "organic mines" to -- organic amines --.
Line 41, after "perfluoroelastomer" add -- composition --.
Line 67, after "of" add -- an --.

Column 12,
Line 22, change "napthalene" to -- naphthalene --.
Line 26, change "butyl peroxy" to -- butylperoxy --.

Signed and Sealed this

Twenty-ninth Day of January, 2002

Attest:

JAMES E. ROGAN
Attesting Officer    Director of the United States Patent and Trademark Office

(12) REEXAMINATION CERTIFICATE (4782nd)
United States Patent
Legare

(10) Number: US 5,696,189 C1
(45) Certificate Issued: May 20, 2003

(54) PERFLUOROELASTOMER COMPOSITIONS

(75) Inventor: John Michael Legare, Newark, DE (US)

(73) Assignee: E. I. DuPont de Nemours and Company, Wilmington, DE (US)

Reexamination Request:
No. 90/006,258, Mar. 28, 2002

Reexamination Certificate for:
Patent No.: 5,696,189
Issued: Dec. 9, 1997
Appl. No.: 08/566,235
Filed: Dec. 1, 1995

Certificate of Correction issued Jan. 29, 2002.

(51) Int. Cl.$^7$ .................................................. C08K 5/20
(52) U.S. Cl. ....................... 524/232; 524/251; 524/423; 524/430; 524/432; 524/437
(58) Field of Search ................................ 524/232, 251, 524/423, 430, 432, 437

(56) References Cited

U.S. PATENT DOCUMENTS

| | | | |
|---|---|---|---|
| 3,311,585 A | 3/1967 | Edlin | 260/29.7 |
| 4,035,565 A * | 7/1977 | Apotheker et al. | 524/545 |
| 4,214,060 A * | 7/1980 | Apotheker et al. | 525/368 |
| 4,271,275 A | 6/1981 | MacLachlan | 525/112 |
| 4,281,092 A | 7/1981 | Breazeale | 526/247 |
| 4,599,370 A | 7/1986 | Grossman et al. | 523/200 |
| 4,708,988 A * | 11/1987 | Tabb | 525/193 |
| 4,713,418 A | 12/1987 | Logothetis et al. | 525/200 |
| 4,722,758 A | 2/1988 | Barrett et al. | 156/53 |
| 4,879,362 A | 11/1989 | Morgan | 526/247 |
| 4,900,793 A | 2/1990 | Lagow et al. | 525/326.3 |
| 4,904,726 A | 2/1990 | Morgan et al. | 524/520 |
| 4,983,680 A | 1/1991 | Ojakaar | 525/281 |
| 5,206,293 A * | 4/1993 | Sakai et al. | 525/194 |
| 5,317,074 A * | 5/1994 | Hammar et al. | 433/18 |
| 5,444,116 A | 8/1995 | Amin et al. | 524/495 |
| 5,461,107 A * | 10/1995 | Amin et al. | 277/500 |

FOREIGN PATENT DOCUMENTS

| | | |
|---|---|---|
| EP | 0 038 535 | 10/1981 |
| JP | 62-81440 | 4/1987 |
| WO | WO 95/02634 | 1/1995 |

OTHER PUBLICATIONS

Research Disclosure 28547 Jan. 1988, Improved Acid Resistance of Fluoroelastomers with PTFE Resin.

Anestis Logothetis, Chemistry of Fluorocarbon Elastomers, Prog. Polym Sci. 14, 251 (1989).

* cited by examiner

*Primary Examiner*—Bernard Lipman

(57) ABSTRACT

Perfluoroelastomer compositions substantially free of elemental carbon, having selected metallic reinforcing filler and titanium dioxide, when cured, exhibit excellent performance characteristics in dry process semiconductor sealing applications.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-25 is confirmed.

* * * * *